June 3, 1930.  L. HAUBERT  1,761,828
POWER DELIVERING ATTACHMENT FOR TRACTORS
Filed Aug. 21, 1928   3 Sheets-Sheet 2
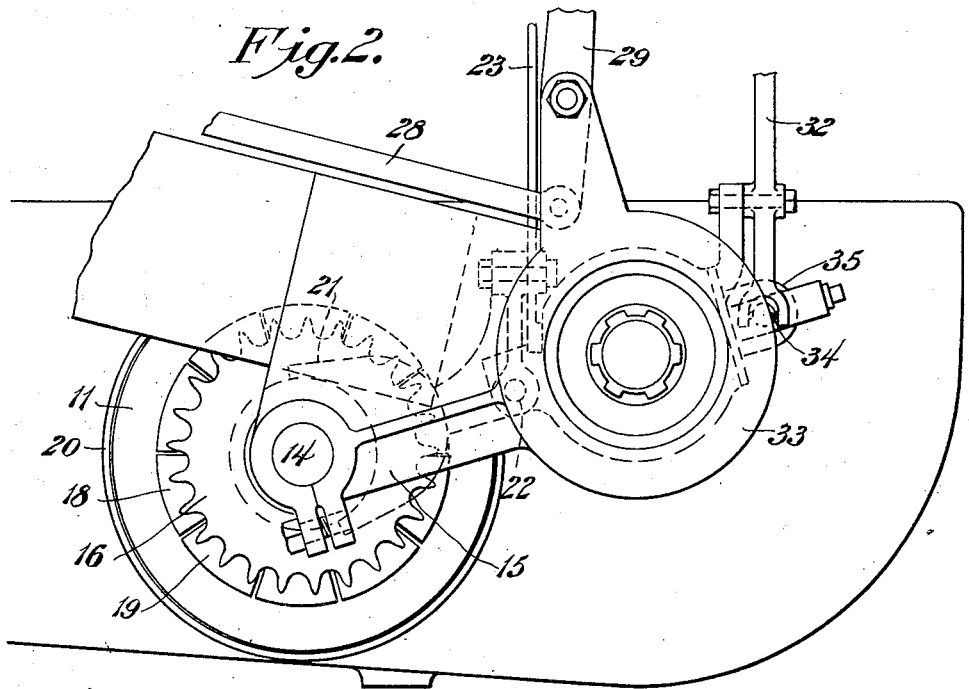
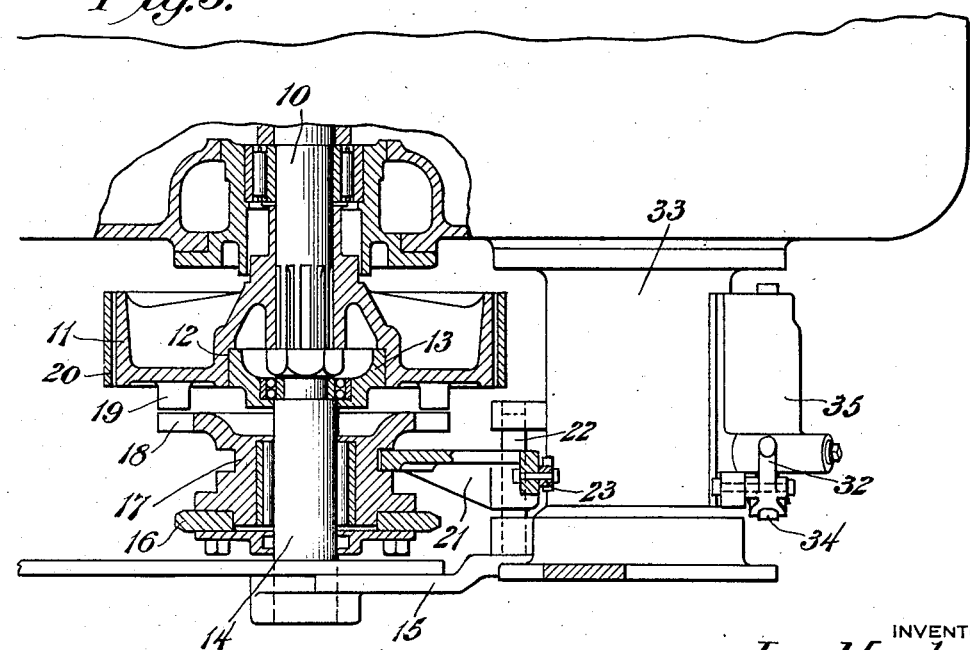
INVENTOR
Leo Haubert,
BY
Siggers & Adams,
ATTORNEYS

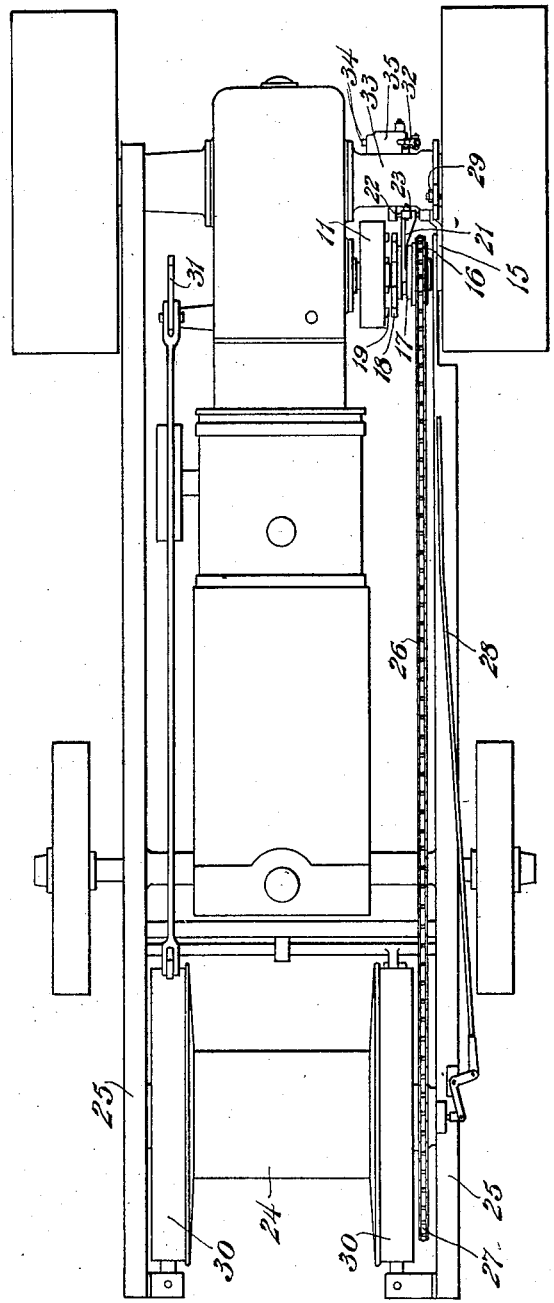

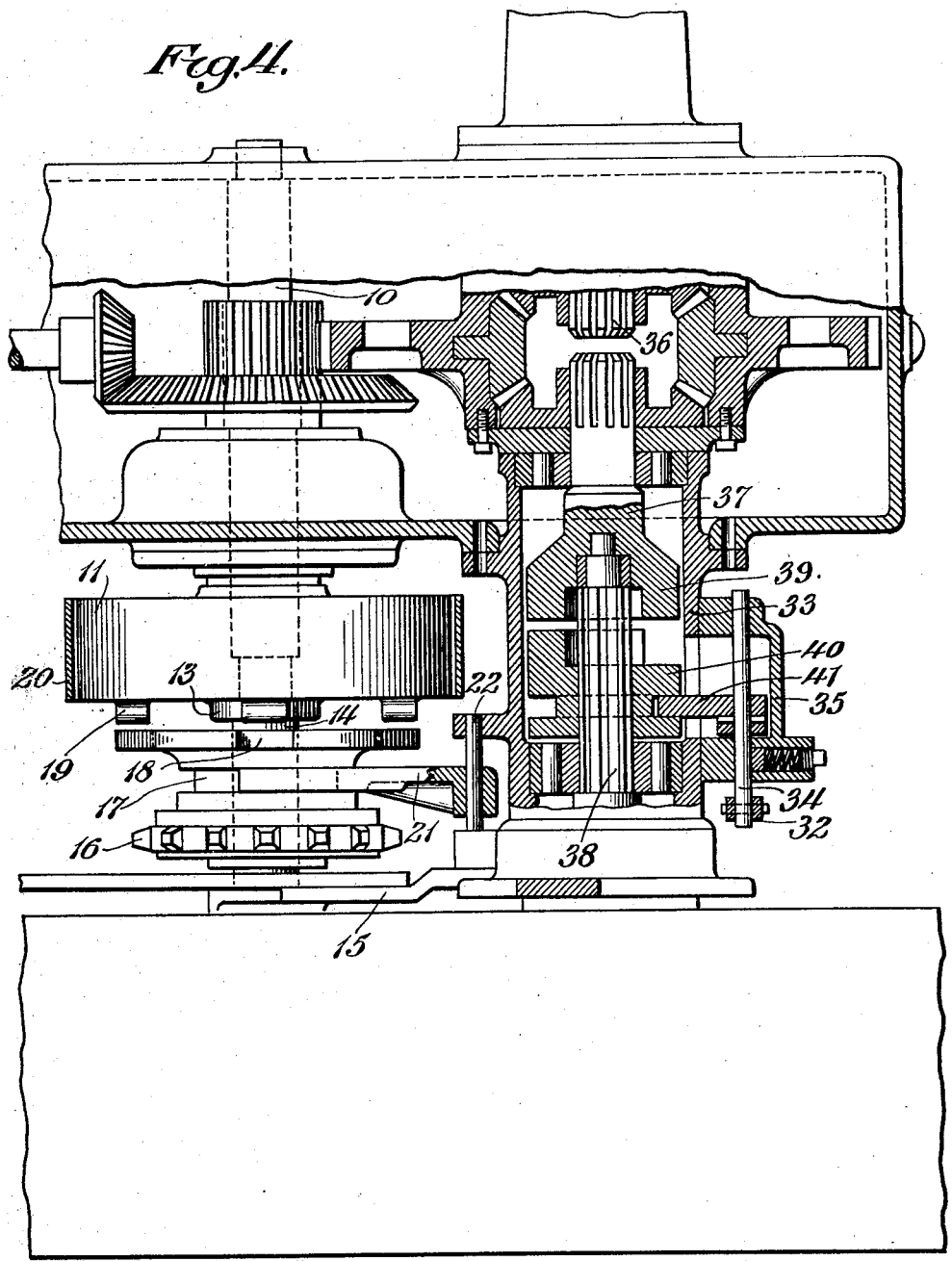

Patented June 3, 1930

1,761,828

UNITED STATES PATENT OFFICE

LEO HAUBERT, OF TULSA, OKLAHOMA, ASSIGNOR OF ONE-THIRD TO JOHN C. BENNETT AND ONE-THIRD TO JOHN A. WOLFE, BOTH OF TULSA, OKLAHOMA

POWER-DELIVERING ATTACHMENT FOR TRACTORS

Application filed August 21, 1928. Serial No. 301,134.

This invention relates to power delivering attachments for commercial tractors, such as are used for driving hoisting drums and the like and aims, among other objects, to provide improved power take-off mechanism which can easily be made as an attachment and can be so arranged that it derives its power through the tractor transmission gearing without requiring any extra change speed gears. Also, the invention contemplates an improved traction wheel disconnecting means associated with one axle of the tractor, so that the tractor can drive a hoisting drum while it is standing still.

This application is a continuation in part of my application, Serial No. 115,868, filed June 14, 1926, and entitled Power delivering attachments for automobiles, trucks or tractors.

In the accompanying drawings—

Fig. 1 is a top plan view of a tractor having the preferred embodiment of power delivering attachment and associated mechanisms applied thereto;

Fig. 2 is a fragmentary, vertical sectional view on an enlarged scale, taken through the power delivering attachment;

Fig. 3 is a fragmentary horizontal section also on an enlarged scale of the rear end of the tractor, the wheel being omitted; and Fig. 4 is a fragmentary view partly in section showing the tractor driving mechanism and a disconnecting clutch.

Referring particularly to the drawings, the preferred embodiment of the invention there shown, is applied to a tractor of the McCormick-Deering type; that is to say, a tractor having a bull pinion shaft as a part of its driving mechanism whether or not it is of the crawler or regular traction wheel type. An example of the type of tractor illustrated is shown in United States Patent No. 1,559,617.

Herein, the improved power delivering attachment derives its power from the bull pinion shaft 10 and is associated with the tractor brake wheel or drum 11. The usual drum is modified by providing a recess or opening 12 in its outer face around the end of the shaft and in the recess is a combined dust cover for the end of the shaft and in ball bearing support 13 for the end of a stub shaft 14 aligned with the bull pinion shaft and having a supporting arm 15 extending forwardly from the rear axle housing to provide a support at the other end of the stub shaft.

The stub shaft is shown as having a power delivering sprocket 16 and a clutch collar 17 rotatably and slidably mounted on it, the collar having clutch teeth 18 co-operating with clutch teeth 19 on the outer face of the brake wheel 11, the arrangement being such that the sprocket can easily be connected to be driven by the bull pinion shaft and the usual brake 20 of the tractor may be used as a brake for the sprocket. The clutch shifting yoke 21 is shown as being slidably mounted on a short shaft 22 supported on the rear axle housing and may be shifted by an upstanding lever 23 (Fig. 2) accessible from the driver's seat.

In the present example, the power delivering attachment is utilized to drive a hoisting drum 24 (Fig. 1) supported on a special frame 25 above the forward end of the tractor, the frame being conveniently made of structural steel shapes extending forwardly and upwardly from the rear axle housings. The drum is preferably driven by a sprocket chain 26 trained over the sprocket 16 and a drum sprocket 27. Also the drum has a clutch (not shown) between it and the drum sprocket and this clutch is adapted to be controlled by a clutch control rod 28 to which is connected a lever 29 adjacent to the driver's seat. Further, the drum is shown as having the usual drum brakes 30 also adapted to be controlled by a brake lever 31 near the driver's seat.

To enable the power delivering attachment to function while the tractor is standing still, it is necessary to disconnect the rear wheels from the tractor differential or the transmission gearing. In the present example, I employ a single split axle somewhat similar to that shown and claimed in my Patent 1,469,002, granted September 25, 1923 and substantially identical with that shown in my copending application, Ser. No.

93,404, filed March 9, 1926; that is to say, one axle is made in two parts so that one wheel can be disconnected by a clutch and thereby disable both wheels. However, in the present example, the clutch is controlled by a clutch shifting lever 32 arranged behind the left axle housing 33, the yoke for the clutch being carried by a shifting bar 34 slidable in a housing 35 secured to the axle housing. This arrangement permits the axle clutch to be placed entirely out of the way of the power delivering mechanism and also avoids the necessity to disturb the housing for the rear right hand axle or to make any change whatever on that side of the tractor.

In Fig. 4 there is shown the usual differential gearing in a tractor of the type disclosed in Figs. 1 to 3 and also a split-axle clutch like that shown in my aforesaid copending application, Ser. No. 93,404, except that the clutch is on the left axle instead of the right axle. Herein, the inner end of the right axle 36 is shown in the broken away part of the differential housing. Since this axle is the same as that shown in the aforesaid Johnston patent, it requires no further illustration. But the left axle is made in two parts 37 and 38, the part 37 having an integral clutch element 39 and the other part having a bearing within the clutch element 39 and a slidable clutch element 40 co-operating with the element 39 is splined on said part so as to be operated by a yoke 41 on the shifting bar 34 as previously explained. In this illustrative example, the clutch is disengaged so as to disconnect the rear wheels of the tractor and thus make it stand idle while the power delivering mechanism is being driven by the bull pinion shaft 10.

In the operation of the tractor for hoisting purposes, it will be understood that the rear wheels or crawlers, as the case may be, are first disconnected and then the clutch collar 17 on the stub shaft 14 is shifted to engage the brake wheel. Power is thus delivered to the hoisting drum through the sprocket chain and the speed is controlled by the tractor gear shifting lever through the transmission. This avoids the necessity to employ any special power take-off transmission or speed changing gearing.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. In combination with a tractor having a bull pinion shaft in its driving mechanism arranged forwardly of the rear axle housing, a stub shaft aligned with the bull pinion shaft; a bracket on the rear axle housing providing a support for the outer end of the stub shaft; a support for the inner end of the stub shaft supported by the bull pinion shaft; a power delivering sprocket on the stub shaft; and a clutch to connect the sprocket to be driven by the bull pinion shaft.

2. In combination with a tractor having a bull pinion shaft in its driving mechanism, a brake wheel secured to the bull pinion shaft; a stub shaft aligned with the bull pinion shaft and having a driving sprocket thereon; a support for one end of the stub shaft carried by the brake wheel; a support for the other end of the stub shaft supported by the tractor; a sprocket on the stub shaft; and a clutch between the brake wheel and the sprocket.

3. In combination with a tractor having a bull pinion shaft in its driving mechanism, a brake wheel on the shaft having a recess about the outer end of the shaft; a stub shaft aligned with the bull pinion shaft; a combined dust cover for the end of the bull pinion shaft and a supporting element for the stub shaft inserted in said recess in the brake wheel; a sprocket on the stub shaft; and a co-operating clutch elements on the brake wheel and on the stub shaft to connect the sprocket to be driven by the bull pinion shaft.

4. In combination with a tractor, a power delivering attachment adjacent to one of the rear axle housings of the tractor and having a clutch to connect it to the tractor transmission gearing; and means associated with the axle adjacent to said power delivering attachment to disable the rear wheels of the tractor.

5. In a tractor of the type wherein a master gear in the differential gearing is driven by a bull pinion mounted on a bull pinion shaft in the tractor housing and projecting through one side of the housing, a power delivering attachment arranged to be driven by said bull pinion shaft including a fixed shaft adjacent to the bull pinion shaft; a sprocket rotatably mounted on said fixed shaft; and a clutch for connecting said sprocket to be driven by said bull pinion shaft.

6. In a tractor of the type wherein a master gear in the differential gearing is driven by a bull pinion mounted on a bull pinion shaft in the tractor housing and projecting through one side of the housing, a power delivering attachment for the tractor connected to be driven by said bull pinion shaft; and means associated with one axle of the tractor operative to disconnect the driving wheels from the driving mechanism.

7. In a tractor of the type wherein a master gear in the differential gearing is driven by a bull pinion mounted on a bull pinion shaft in the tractor housing and projecting through one side of the housing, a power delivering attachment adjacent to the projecting end of said bull pinion shaft and connected to be driven thereby; and clutch mechanism associated with one driving axle of the tractor behind said power delivering attachment and operative to disconnect the axles from the tractor transmission gearing.

8. In a tractor of the type wherein a master gear in the differential gearing is driven by a bull pinion mounted on a bull pinion shaft in the tractor housing and projecting through one side of the housing, a power delivering attachment associated with the projecting end of said bull pinion shaft; means to connect the power delivering attachment to be driven by said bull pinion shaft; and clutch means independent of the transmission control mechanism of the tractor operative to disconnect the driving axles of the tractor while the power delivering attachment is being operated.

9. In combination with a tractor of the type wherein a transverse bull pinion shaft is mounted in the tractor housing in front of and adjacent to the differential housing and a tractor brake is associated with the bull pinion shaft, a power delivering attachment also associated with said bull pinion shaft having provision to be operatively connected thereto, whereby the said brake may also be used in conjunction with said power delivering attachment.

10. In a tractor of the type wherein a master gear in the differential gearing is driven by a pinion mounted on a bull pinion shaft in the tractor housing and projecting through one side of the housing, a power delivering attachment connected to deliver power from said bull pinion shaft; and means operable to disconnect the driving axles of the tractor from the driving mechanism so that power can be delivered while the tractor is standing idle.

11. In a tractor of the type wherein a master gear in the differential gearing is driven by a bull pinion mounted on a bull pinion shaft in the tractor housing and projecting through one side of the housing, a power delivering attachment connected and arranged to deliver power from said bull pinion shaft; and a clutch in the tractor driving mechanism operative to disconnect the traction wheels from the transmission gearing, whereby power may be delivered while the tractor is standing idle.

12. In a tractor of the type wherein a master gear in the differential gearing is driven by a bull pinion mounted on a bull pinion shaft in the tractor housing and projecting through one side of the housing, a clutch associated with said power delivering attachment to control the operative connection; and clutch means in the tractor driving mechanism operative to disconnect the axles from the tractor transmission while power is being delivered through said bull pinion shaft.

13. In a tractor of the type wherein a master gear in the differential gearing is driven by a bull pinion mounted on a bull pinion shaft in the tractor housing and projecting through one side of the housing; a power delivering sprocket operatively connected to be driven by said bull pinion shaft; clutch means associated with the axle of the tractor which is behind said power delivering sprocket; and manual means to operate the clutch so as to disconnect the rear axles from the differential and thereby enable the tractor to stand idle while the bull pinion shaft is delivering power at all of the speeds obtainable through the tractor driving mechanism.

In testimony, that I claim the foregoing as my own, I have hereto affixed by signature.

LEO HAUBERT.